May 7, 1946.  G. E. GUELLICH  2,399,799
PROCESS OF MAKING OPTICAL DEVICES
Filed Feb. 11, 1943  2 Sheets-Sheet 1
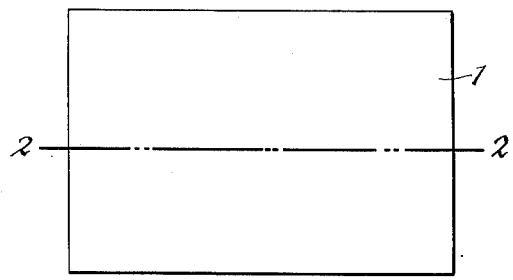
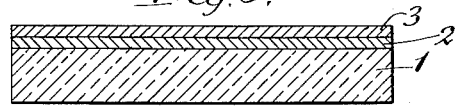
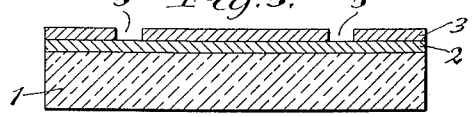
INVENTOR.
GUSTAV E. GUELLICH
BY Raymond A. Paquin
ATTORNEY

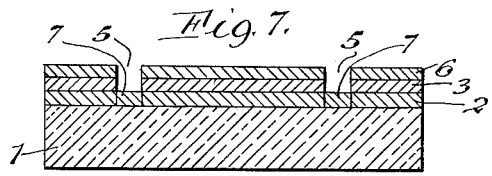
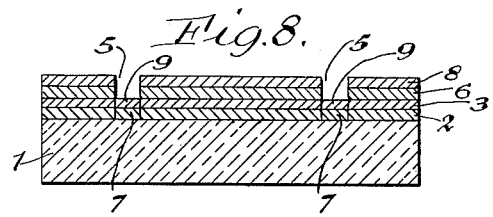
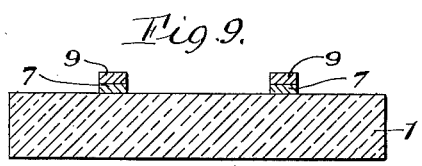
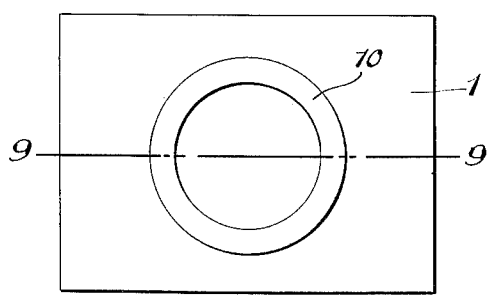

Patented May 7, 1946

2,399,799

UNITED STATES PATENT OFFICE 2,399,799

PROCESS OF MAKING OPTICAL DEVICES

Gustav E. Guellich, Buffalo, N. Y., assignor, by mesne assignments, to American Optical Company, Southbridge, Mass., a voluntary association Application February 11, 1943, Serial No. 475,557

6 Claims. (Cl. 95—5.7)

This invention relates to optical devices and more particularly to means for altering the characteristics of light passing therethrough and to the process of producing the same.

In the application of Osterberg et al., Serial Number 456,726, filed August 28, 1942, there is shown and described discs or plates adapted to increase the contrast between various portions of the image of the object viewed therethrough. These discs or plates comprised means for increasing and intensifying differences in the appearance of objects of different refractive index and such discs or plates were capable of introducing absorption and for phase change in varying amounts of the light passing therethrough.

The production of such discs or plates is difficult since it requires the deposition of a pattern consisting of a metallic film upon which a film of material such as magnesium is superimposed without causing any displacement or overlapping of the two images. Furthermore it is necessary that the line of demarcation between said metallic film and said superimposed film of magnesium fluoride be sharp and well defined.

This is also true where but a single layer of either the metallic film or the film of magnesium fluoride or similar substances is employed.

This application, therefore, relates to new and improved forms of such discs or plates and to the process of making the same.

It is pointed out that the process of the present invention may also be employed in the construction of reticules, haemacytometers and similar devices.

Referring to the drawings:

Fig. 1 is a view of a blank on which the pattern is to be formed;

Fig. 2 is a sectional view taken on line 2—2 of Fig. 1;

Fig. 3 is a view similar to Fig. 2 but showing a step in the process;

Fig. 4 is a view similar to Fig. 3 but showing a further step in the process;

Fig. 5 is a view similar to Fig. 4 but showing a further step in the process;

Fig. 6 is a view similar to Fig. 5 but showing a further step in the process;

Fig. 7 is a view similar to Fig. 6 but showing a further step in the process;

Fig. 8 is a view similar to Fig. 7 but showing a further step in the process;

Fig. 9 is a view similar to Fig. 2 but showing one form of finished disc or plate; and Fig. 10 is a view similar to Fig. 1 but showing one form of finished device.

Referring more particularly to the drawings wherein similar reference characters designate corresponding parts throughout the several views, there is shown in Figs. 1 and 2 a blank of a transparent material such as glass or synthetic resin or the like on which the pattern is to be formed.

On the surface of this blank 1 is first deposited a coating or layer 2 of silver. This layer 2, instead of being of silver, could be of palladium or copper or other suitable metals, and is preferably of a thickness sufficient to be substantially opaque, and may be applied by depositing metal from a solution of metallic salts in water or by evaporation or sputtering in a vacuum by well known methods.

This metallic coating or layer 2 may consist of a single layer or a multiple layer of different metals a layer of copper over a layer of silver. In addition to the methods described above the second layer may be applied by electro-deposition.

Over the surface of the metallic layer 2 is placed a layer or coating 3 of a sensitized material such as bichromated shellac or sensitized or bichromated shellac or glue, albumin or synthetic plastics such as furfural resin or other suitable sensitized material.

This layer 3 of sensitized material is preferably from one-thousandth to one one-hundred thousandth of an inch but it is pointed out that if the layer 3 is too thick the exposure time increases considerably and if said coating 3 is too thin it will be easily penetrated by the acid or other etching solution employed in the process.

A negative 4 containing the dense portions 4a is then placed in contact with the sensitized layer 3 and exposed to light thereby making insoluble the portions exposed to the light through the clear portions of the negative. Instead of contact printing, projection printing may be employed.

The negative 4 is then removed and the latent image on the sensitized layer 3 is developed which process removes the portion 5 of the sensitized layer 3 which was not exposed to the light and the pattern or outline of which conforms to the pattern or outline of the dense portions 4a of the negative.

After the development, the exposed portions of the metallic layer 2, which portions are exposed by the removal of the portions 5 of the sensitized layer 3 are dissolved with a suitable acid such as dilute nitric acid or a solution of ferric chloride in water.

Copper and palladium are preferably etched with a solution of ferric chloride in water. When the ferric chloride solution is used on silver, the silver will be converted into silver chloride which may subsequently be dissolved by sodium thiosulphate.

The above provides an arrangement as shown in Fig. 6.

After careful cleaning of the surface thus produced the composite plate is transferred into a vacuum chamber and slowly heated to a temperature sufficiently high to remove most of the gases absorbed to the surface. Then aluminum is evaporated in the vacuum chamber and deposits or forms the uniform coating 6 of desired transparency over the surface of the layer 3 and the coating 7 on the exposed portions of the base 1, that is, a uniform layer of aluminum is deposited over the entire exposed surface facing the source of coating material.

Next, there may be over the surface of the aluminum layers, deposited by the same evaporation method, a layer or coating of magnesium fluoride, cryolite or the like. This forms a uniform coating 8 and 9 of such material over the surface of the aluminum coated areas 6 and 7 respectively.

Thereafter the composite plate is removed from the vacuum chamber and immersed into concentrated nitric acid which acid dissolves the sensitized layer 3 as well as the metallic layer 2 under said sensitized layer 3 which allows the easy removal of said layers 2 and 3 and the layers deposited thereon leaving the plate 1 exposed in the areas previously covered by the layer 2. This acid does not dissolve the aluminum and magnesium layers 7 and 9 and they remain on the surface of the plate 1 after removal of the other coatings as stated above.

The resultant article is a pattern of desired contour on the surface of the base 1 as shown in Fig. 10.

If desired, either the aluminum layer or the magnesium fluoride layer may be used without the other of said layers depending upon the light altering characteristics desired in the finished article.

The above process may also be employed for making reticules for optical instruments.

In making such reticules, after the article is completed as described above and in this case with the aluminum coating either opaque or of low transparency, and with or without the additional coat of magnesium fluoride or the like or, if desired, coatings may be placed over the aluminum layer of other metals which are substantially insoluble in nitric acid and which will not be attacked by hydrofluoric acid such as most platinum metals, gold or other suitable metals.

Any such additional coatings should be applied prior to the nitric acid treatment as previously described.

The areas not covered by the layers 7 and 9, that is, the layers forming the pattern areas of the finished device described above are etched with hydrofluoric acid or with mixtures of sulphuric acid and ammonium fluoride or other fluorides. This acid etching reduces the level of the surface of the plate 1 surrounding the pattern area which area is not affected and therefore the surface of said area is somewhat above the surface of the acid etched portion.

The aluminum or other metallic layer 7 is then removed by immersion in a suitable solvent such as hydrochloric acid or aqua regia which is a mixture of hydrochloric acid and nitric acid.

Then the etched surface of the plate 1 surrounding the pattern area as described above may be filled with any of the known fillers such as mixtures of sodium silicate with titanium dioxide or iron oxide.

Where the process is applied to the manufacture of reticules, such reticules may be of desired pattern or outline such as cross lines, mill scales, concentric circles or other desired contours.

From the foregoing it will be seen that I have provided simple, efficient and economical means for obtaining all of the objects and advantages of the invention.

Having described my invention, I claim:

1. The process of forming devices of the character described comprising placing a metallic layer over a transparent base, placing a sensitized layer over said metallic layer, exposing certain portions of said sensitized layer to light for a time sufficient to make said portions insoluble, removing the soluble portions of said sensitized layer and the portions of said metallic layer exposed by the removal of said soluble portions, placing a coating having desired light altering properties over said exposed portions of said transparent base, removing the insoluble portions of said sensitized layer and the layers superimposed thereon, and etching the portions of said transparent base which are exposed by the removal of said insoluble portions of said sensitized layer.

2. The process of forming devices of the character described comprising placing a metallic layer over a transparent base, placing a sensitized layer over said metallic layer, exposing certain portions of said sensitized layer to light for a time sufficient to make said portions insoluble, removing the soluble portions of said sensitized layer and the portions of said metallic layer exposed by the removal of said soluble portions, placing a coating having desired light altering properties over said exposed portions, of said transparent base, removing the insoluble portions of said sensitized layer and the layers superimposed thereon, and etching the portions of said transparent base which are exposed by the removal of said insoluble portions of said sensitized layer, and removing said light altering layer.

3. The process of forming devices of the character described comprising placing a metallic layer over a transparent base, placing a sensitized layer over said metallic layer, exposing certain portions of said sensitized layer to light for a time sufficient to make said portions insoluble, removing the soluble portions of said sensitized layer and the portions of said metallic layer exposed by the removal of said soluble portions, placing a coating having desired light altering properties over said exposed portions of said transparent base, removing the insoluble portions of said sensitized layer and the layers superimposed thereon, and etching the portions of said transparent base which are exposed by the removal of said insoluble portions of said sensitized layer and applying to said etched surface a filler material.

4. The process of applying on a surface of an optical element a light modifying coating corresponding accurately to a predetermined pattern consisting in coating said surface with a layer of metal soluble in nitric acid, applying a resist over said metallic layer, photographically reproducing a pattern in said resist with predetermined portions of said resist insoluble and other portions soluble, dissolving the soluble portions of said resist and the underlying portions of said metallic layer to expose portions of the underlying surface of said optical element, depositing over said resist and the exposed portions of said optical element a light transmitting layer of a metal which is insoluble in nitric acid and removing the remaining portions of said resist and of the first mentioned metal layer by leaching with concentrated nitric acid without removing said light transmitting layer of metal.

5. The process of applying on a surface of an optical element a light modifying coating corresponding accurately to a predetermined pattern consisting in coating said surface with a metallic layer soluble in nitric acid, applying a resist over said metallic layer, photographically reproducing a pattern in said resist with predetermined portions of said resist insoluble and other portions soluble, dissolving the soluble portions of said resist and removing the underlying portions of said metallic layer to exposed portions of the underlying surface of said optical element, depositing over said resist and the exposed portions of said optical element a light transmitting layer of aluminum, and removing the remaining portions of said resist and of said metallic layer by leaching with concentrated nitric acid without removing said light transmitting layer of aluminum.

6. The process of applying on a surface of an optical element a light modifying coating corresponding accurately to a predetermined pattern consisting in coating said surface with a silver layer, applying a resist over said silver layer, photographically reproducing a pattern in said resist and removing both the soluble portions of said pattern and the silver layer underlying said soluble portions to expose in accordance with said pattern the underlying surface of said optical element, depositing over said resist and said exposed portions of said optical element a light transmitting layer of aluminum and removing the remaining portions of said resist and then of said silver by leaching with concentrated nitric acid without removing said light transmitting layer of aluminum.

GUSTAV E. GUELLICH.